(12) United States Patent
Harrison et al.

(10) Patent No.: US 8,097,671 B2
(45) Date of Patent: Jan. 17, 2012

(54) CARBON BLACK WITH LARGE PRIMARY PARTICLE SIZE AS REHEAT ADDITIVE FOR POLYESTER AND POLYPROPYLENE RESINS

(75) Inventors: David A. Harrison, Redcar Cleveland (GB); J. Paul Davis, Billingham Stockton-On-Tees (GB)

(73) Assignee: Invista North America S.A.R.L., Wilmington, DE (US)

( * ) Notice: Subject to any disclaimer, the term of this patent is extended or adjusted under 35 U.S.C. 154(b) by 0 days.

(21) Appl. No.: 12/879,045

(22) Filed: Sep. 10, 2010

(65) Prior Publication Data

US 2011/0073558 A1    Mar. 31, 2011

Related U.S. Application Data

(62) Division of application No. 10/984,506, filed on Nov. 8, 2004, now Pat. No. 7,816,436.

(51) Int. Cl.
    *C08L 67/02* (2006.01)
(52) U.S. Cl. .......................... 524/401; 524/424; 428/458
(58) Field of Classification Search .................. 524/401, 524/424; 428/458
    See application file for complete search history.

(56) References Cited

U.S. PATENT DOCUMENTS

| 4,340,721 A | 7/1982 | Bonnebat et al. |
| 4,408,004 A | 10/1983 | Pengilly |
| 4,476,272 A * | 10/1984 | Pengilly ........................ 524/398 |
| 4,535,118 A | 8/1985 | Pengilly et al. |
| 5,419,936 A | 5/1995 | Tindale |
| 5,529,744 A | 6/1996 | Tindale |
| 5,925,710 A | 7/1999 | Wu et al. |
| 6,022,920 A | 2/2000 | Maxwell et al. |
| 6,034,167 A | 3/2000 | Tung et al. |
| 6,258,313 B1 | 7/2001 | Gottlieb |
| 6,503,586 B1 | 1/2003 | Wu et al. |
| 2002/0011694 A1 | 1/2002 | Nichols et al. |
| 2003/0018115 A1 | 1/2003 | Massey et al. |
| 2004/0101642 A1 | 5/2004 | Quillen et al. |
| 2004/0180159 A1 * | 9/2004 | Neal et al. ..................... 428/35.7 |
| 2004/0249113 A1 | 12/2004 | Quillen et al. |

FOREIGN PATENT DOCUMENTS

EP   0 884 365   12/1998

OTHER PUBLICATIONS

Organic Chemical Process Industry, Chapter 6.1, Carbon Black; http://www.epa.gov/ttn/chief/ap42/ch06/final/c06s01.pdf.

* cited by examiner

*Primary Examiner* — Robert D. Harlan
(74) *Attorney, Agent, or Firm* — Womble Carlyle Sandridge & Rice, LLP

(57) ABSTRACT

Reheat characteristics of polyethylene and polypropylene resins, including reheating time and resin color, are improved by adding to the resin carbon black with a primary particle size in the range of 200 to 500 nm as an infrared absorber. Thermal carbon blacks having this primary particle size are preferred over Furnace carbon blacks. Injection stretch-blow molded bottles and other thermoformed products are made from resins with carbon black infrared absorber.

14 Claims, 8 Drawing Sheets derhalf CARBON BLACK WITH LARGE PRIMARY
PARTICLE SIZE AS REHEAT ADDITIVE FOR
POLYESTER AND POLYPROPYLENE RESINS

CROSS REFERENCE TO RELATED
APPLICATION

This application is a division of U.S. patent application Ser. No. 10/984,506 filed Nov. 8, 2004 now U.S. Pat. No. 7,816,436.

FIELD OF THE INVENTION

The present invention relates to the manufacture of bottles, containers and other articles from polyester and polypropylene compositions that exhibit faster heat-up rates as a result of the addition of low levels of carbon black to the polymer. Faster heat-up rates reduce the time and energy needed to manufacture containers made from polyethylene terephthalate and polypropylene by injection stretch blow molding.

BACKGROUND OF THE INVENTION

Polymer compositions, such as polyethylene terephthalate (PET) and polypropylene (PP) are well known packaging materials. For example, U.S. Pat. No. 4,340,721 describes a PET composition used to manufacture beverage bottles and other containers (hereinafter referred to as "bottles") by various molding methods.

Bottles made from PET, such as for mineral water and carbonated beverages, are generally made by injection stretch-blow molding. This technique involves the injection molding of a "preform" which is subsequently blow molded into the final bottle shape. This may be carried out on separate injection mold and stretch-blow machines or on a single machine where the two steps are combined. Preforms usually consist of a threaded neck with a shortened bottle body shape 8 to 20 cm long with a material thickness between 3 mm and 6 mm. In order to blow the bottle, the preform is reheated by infrared lamps to a specific temperature above the glass transition point of the PET, such that it can be stretched and blown into a mold of the desired shape.

In general, PET resins have a poor ability to absorb infrared radiation. The preform heating and stretch blow moulding stage therefore becomes a rate-limiting factor in the overall bottle production process. Furthermore, the preform heating step also requires a significant amount of energy. To address this, many grades of commercial PET bottle resin incorporate additives to improve the heat-up rate (hereinafter referred to as "faster reheat") of the preforms. The aim is to increase the rate of blowing, and thereby the overall productivity, as well as to reduce the energy required to reheat the preform.

In practise, the additives used to improve reheat in PET are finely dispersed inert black materials that strongly absorb radiant energy at the wavelengths emitted by the infrared lamps (generally between 500 and 2000 nm) used in stretch blow moulding machines. Examples of the materials used in PET are carbon black, as described in U.S. Pat. No. 4,408,004, graphite as described in U.S. Pat. Nos. 5,925,710 and 6,034,167, black iron oxides as described in U.S. Pat. No. 6,022,920, iron phosphide and iron silicide as described in U.S. patent application publication 2003/0018115 A1 and black spinel pigments as described in U.S. patent application publication 2002/0011694 and U.S. Pat. No. 6,503,586. The addition levels of these additives, in order to obtain the desired level of reheat improvement, is generally between 5 and 100 ppm.

Improved reheat in PET has also been shown by the use of antimony metal particles. These particles are usually deposited by a chemical reaction between the antimony polymerisation catalyst and a reducing agent (for example phosphorous acid) during the melt polymerisation stage, as described in U.S. Pat. Nos. 5,419,936 and 5,529,744.

Whilst the reheat improvement described above generally applies to PET, a further consideration, and a main embodiment of this invention, is the improvement of reheat in PP resins. PP is increasingly replacing PET for bottles for many beverage applications due to its lower material cost. U.S. Pat. No. 6,258,313 teaches that injection stretch blow molding of a PP preform is possible if the preform is heated simultaneously both from the outside and inside. Nevertheless, until recently it has been more difficult to produce satisfactory beverage bottles from PP than PET by this method. Firstly, polypropylene has a lower density and specific heat than PET and hence exhibits a significantly narrower processing window. Secondly, polypropylene suffers from the same limitations as PET in terms of its poor ability to absorb IR radiation. In general, polypropylene also has a greater opacity than PET, which detracts from its aesthetic appearance. The industry therefore continues to seek ways to improve the IR absorption properties of polypropylene such that it can be used to make beverage bottles on the same injection stretch blow-molding equipment as PET.

For PET and PP resin manufacturers who do not wish or are unable to use other black body absorbers, a convenient additive for improved reheat is carbon black. Carbon black offers the advantages of inertness, low cost, and ease of dispersion in the resin compared to other absorbing materials. Carbon black also exhibits a high degree of absorption at near-infrared wavelengths. It also has a high emissivity and hence a high proportion of the increase in temperature of the particles resulting from this absorption is transferred to the surrounding polymer. Thus very low levels of carbon black need to be added to the polymer in comparison to other black materials.

In using these additives, bottle manufacturers aim to maximise the improvement in reheat whilst minimising the impact on the colour and haze of the final bottle. By definition, the addition of a black material to the resin leads to darker bottles that are perceived to be less attractive than perfectly colourless ones. A particular disadvantage of carbon black is the dark hue and yellow-brown color tone imparted to the resin containing even very small amounts of carbon black. This problem becomes increasingly apparent as manufacturers aim for progressively faster reheat rates. Black materials that meet a desired combination of reheat and color performance continue to be sought.

SUMMARY OF THE INVENTION

This invention is a method for improving the reheat characteristics of PET and PP preforms by the addition of carbon black with a primary particle size in the range 200 to 500 nm as an infrared absorber in the resin. This form of carbon black allows faster preform heat-up rates in PET and PP preforms at any specific level of enhanced reheat. Furthermore, the addition of carbon black with this particle size unexpectedly yields superior resin color to that obtained by using the other types of carbon black described in the prior art.

Particularly preferred carbon blacks have a primary particle size in the range of 200 to 500 nm and are farmed by the carbon black Thermal Process.

BRIEF DESCRIPTION OF THE DRAWINGS

The present invention will be described in the following detailed description with reference to the following drawings, wherein.

DETAILED DESCRIPTION OF THE PREFERRED EMBODIMENTS

Figure 1:
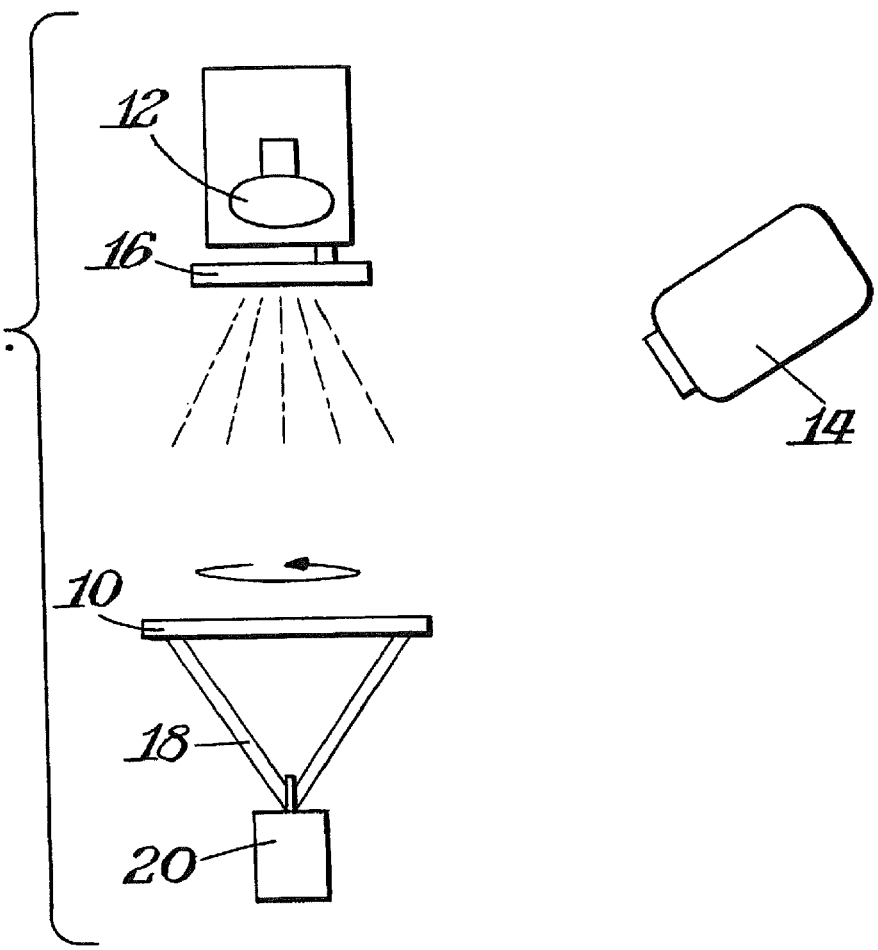
FIG. 1 is a schematic representation of the plaque test for measuring reheat in PET and PP used to obtain the data in Examples 1 and 2.

The use of carbon black to improve reheat was first described in U.S. Pat. No. 4,408,400 to Pengilly, and subsequently in U.S. Pat. Nos. 4,476,272 and 4,535,118 also to Pengilly. These patents contain specific claims for the addition of 1 to 5.5 ppm carbon black with a particle size of 10 to 100 nm, but with a preferred particle size range of 15 to 30 nm. The specific types of carbon black described in the examples are forms referred to as "Channel" or "Furnace" black, with a particle size of 25 nm. There are no examples in the Pengilly patents of any type of carbon black other than Channel and Furnace blacks. Furthermore, the Pengilly patents do not state that particle size has any influence on the color of the resin relative to the degree of reheat improvement.

We have now shown that the optical and infrared absorption characteristics resulting from the presence of these black additives at low concentrations is highly dependent on this particle size. Specifically, we have shown that 200 to 500 nm particles unexpectedly produce a superior resin color as compared to 10 to 100 nm carbon black particles at any level of improved reheat. With 200 to 500 nm particles the colour of the resin, and hence the final bottle or other product formed from the resin, is lighter in appearance and grey-blue in color tone. In contrast, with 10 to 100 nm carbon black particles the resin is yellow-brown in color tone and substantially darker at any equivalent level of reheat.

It is well understood that for that for clear beverage bottles, a lighter and grey-blue appearance is commercially preferable to a darker and yellow-brown appearance. Thus as defined by, for example the 1976 CIE designation of color and brightness, the preferred characteristics in a clear bottle are an L* as high as possible, an a* as close as possible to zero and a b* as close as possible to zero. In this case L* is a measure of brightness and can range from 0 (absolute black) to 100 (absolute white). a* is a measure of the red-green color component where an increasingly negative value signifies increasing green color tone and an increasingly positive value signifies increasing red color tone. b* is a measure of the yellow-blue color component where an increasingly negative value signifies increasing blue color tone and an increasingly positive value signifies increasing yellow color tone. Whilst a b* near to zero is preferable, a negative b*, or blue color tone, is preferable to bottle manufacturers than a positive b*, or yellow color tone. "Yellowness" may generally be perceived as degradation or impurity in the resin, whereas "blueness" is not. The main finding of this invention is that the addition of carbon black with a particle size above 200 nm, preferably above 250 nm, leads to higher resin L*, lower resin b* and similar resin a* in comparison to carbon blacks with a particle size of 10-100 nm. Hence, this form of carbon black demonstrates superior color in the final bottle produced by injection stretch blow moulding or other products produced from the resin.

As the concentration of a reheat additive is increased, the resin generally becomes progressively darker and less acceptable for the manufacture of clear and colorless bottles. The level of reheat that can be achieved by the addition of carbon black is therefore limited by the manufacturers' color specification for the final bottle. The reheat that can be obtained by the use of carbon blacks with primary particle sizes of 200 to 500 nm, preferably 250 to 300 nm, is substantially faster at any acceptable limit of resin color, and hence more desirable to bottle manufacturers, than by the use of carbon blacks with particle sizes of 10 to 100 nm.

To produce clear bottles, the carbon black particle size preferably should not exceed 500 nm in diameter, and is preferably between 200 and 500 nm, and most preferably between 250 and 300 nm. The amount of carbon black employed may range from 3 ppm to 50 ppm based upon the weight of the resin. The level used is determined by the level of reheat improvement that is required by the manufacturer. If necessary, master batches of the PET or PP containing quantities of the carbon black in higher concentrations can be made for subsequent blending with the polymer to obtain the desired levels of carbon black in the final bottle.

Suitable PET and PP or compositions in the present invention may be any resin from which bottles, other containers or thermoformed articles in which an improvement in reheat is required, can be made. The method of manufacturing the PET or the PP may be any conventional process that permits the addition of the carbon black to the resin. The carbon black may be introduced to the polymer at any stage in the manufacturing process. The carbon black is inert and does not interact with any other additives, decompose, transform or affect the resin during the manufacturing process and therefore imposes no limitations on the methods of manufacture that may be used.

PET Compositions and Test Samples from these Compositions

In order to demonstrate the present invention for the reheat of PET resin, samples were made in a 70 Kg scale in a batch autoclave reactor. To isolate the effect of the reheat additive all of the batches were made to a fixed composition, with the exception of the type and concentration of added carbon black. The composition used is well understood to be a typical formulation from which PET beverage bottles can be manufactured.

The resin was produced by a conventional process of direct esterification of terephthalic acid with monoethylene glycol, to produce a "monomer" to which catalyst, stabiliser, color toners and the carbon black were added. The monomer was then polymerised under vacuum to a target melt viscosity of 0.60 dl/g, at which point the resulting melt was cast from the autoclave, quenched and cut into granules to give an amorphous "base" resin. 25 Kg batches of the base resin were finally crystallised and further polymerised in the solid state at 210 C in a fluid-bed reactor to a target melt viscosity of 0.82 dl/g to obtain the required polymer viscosity at which bottles could be blown.

To compare the relationship between resin color and reheat, the solid-state polymerised resins containing different types and levels of carbon black were molded into 10 cm diameter×4 mm thick circular plaques on an injection moulding machine. The color and reheat of the resin was measured on these plaques as described below to produce the data shown in Example 1.

PP Compositions and Test Samples from these Compositions

To demonstrate the present invention for the reheat of PP, compositions containing different types of carbon black were prepared by compounding carbon blacks into a control sample of PP resin using two extruders in series. The base PP used for these experiments is a typical grade of PP from which clear bottles can be produced.

The carbon black was first added to the PP granules and the blend compounded through a twin-screw extruder to produce an initial dispersion of the carbon black in the resin. This material was then fed through a single screw extruder fitted with a Cavity Transfer mixer to produce the final composition. A Cavity Transfer mixer was specifically used to create the optimum dispersion of particulate additives and hence the best possible dispersion of the carbon black in the PP.

The final PP compositions were used to injection mould plaques in the same way and on the same machine as for the PET compositions. The color and reheat of the plaques were measured as described below, and gave the data shown in Example 2. The preform blowing data shown in Example 3 was also obtained from compositions made in this way.

PET and PP Reheat Test Methods

The present invention is based on the relationship between the color of the resin and the particle size of the carbon black used to achieve the desired level of reheat. The PET reheat measurements described herein are a based on an arbitrary, but clearly defined, scale of values from the INVISTA standard preform reheat test (INVISTA Standard Test Method for Minimum Blowing Time Test No. MST 116). This test compares the minimum blowing time required to produce a clear PET bottle. The minimum blowing time required for a preform made from the test polymer is compared with that for a preform made from a "zero seconds reheat" standard polymer. The difference is quoted as the "reheat" of the test sample. Thus, faster reheat, which requires a shorter overall blowing time as result of the faster rise in temperature of the preform, is represented by a negative number, this being the number of seconds less than the overall blowing time for the zero seconds reheat preform. Similarly, slower reheat is represented by a positive number, this being the number of seconds more overall blowing time required for the test sample preform than for the zero seconds reheat standard preform.

The minimum blowing time is defined as the point at which a clear and crystallisation-free bottle can be obtained. The overall blowing time is the total of the heating time required to raise the preform to a temperature at which a crystallisation-free bottle can be blown, plus the time to blow and stretch the preform itself. The preform-heating component of the overall blowing time is influenced only by the infrared absorptive characteristics of the resin. However, the preform stretching and blowing time component can be influenced to some extent by the actual composition of the resin (for example comonomer content) and its viscosity.

Thus, in order to eliminate differences in composition and viscosity between test samples and the standard, a secondary test was used based on the temperature rise of injection moulded plaques. In this test, as illustrated in FIG. 1, test samples and standard samples of known preform reheat are moulded into 10 cm diameter×4 mm thickness circular plaques 10. These plaques 10 are heated for a fixed time of 90 seconds beneath a Phillips 175 W infrared lamp 12. After 90 seconds the temperature of the plaque 10 is measured using a Minolta Cyclops 300AF infrared pyrometer 14 focused on the upper surface of the plaque 10. The lamp 12 is fitted with a shutter 16 that opens to expose the plaque 10 to the lamp 12 for 90 seconds, and then closes. The pyrometer 14 automatically measures the temperature of the plaque 10 at the point at which the shutter 16 closes. The plaque 10 is supported on turntable 18 that is rotatable by motor 20. The plaque is rotated beneath the lamp 12 to ensure an even temperature distribution. The infrared lamp 12, pyrometer 14 and plaque turntable 18 are all fixed to the same framework (not shown) to prevent relative movement between the components whilst the temperature data is being obtained. The test is carried out in a fixed temperature environment, and on plaques that have been stored in this environment, to remove any possible influence of the starting temperature or the environment on the final plaque temperature.

Reheat values are obtained by measuring the temperature rise of plaques made from at least three different "standard" polymers of known preform reheat, in the range zero to minus 12 seconds. For the data obtained in the present invention the reheat of the standard plaques was zero, minus 6 and minus 10 seconds. These standard plaques had the same composition and viscosity as the zero second standard plaques. The preform reheat versus the plaque temperature of these is plotted to give a "calibration" line. In our experience of this test, the relationship between plaque temperature rise and the preform reheat for samples with the same viscosity and composition over a range of reheat values is always linear. Thus, by measuring the plaque temperature of test plaques, the equivalent preform reheat can be simply read-off from the linear calibration line produced from standard plaques measured at the same time. The PET reheat values quoted herein are based on the plaque test. Since all the samples produced were made to the same polymer formulation and viscosity, the reheat values would be the same if measured by the preform test.

By the INVISTA preform and plaque tests, the reheat of most grades of PET from which beverage bottles are manufactured falls between minus 15 (−15) and plus 5 (+5) seconds.

For PP, the same test was used except that, in the absence of an existing PP preform reheat standard by which the test could be calibrated, only the final plaque temperature itself was used as shown in Example 2.

In the PP blowing experiment data shown in Example 3, the reheat of compositions made with the different types of carbon black is also compared in terms of the cycle time reduction observed during the experiment.

PET and PP Color Test Method

The color measurements described in the present invention were made using a Gardner BYK Color-View spectrophotometer Model No. 9000. The same procedure was used for plaques molded from both the PET and PP compositions. Color was measured by placing each plaque beneath a standard white tile and recording the reflected color of the tile using the 1976 CIE L*, a* and b* designation of color and brightness. The backing tile had the color values L* 93.10, a* 0.13 and b* 3.55.

The plaque color is a useful indication of the preform color, being of comparable wall thickness, but simpler to measure by conventional measurement techniques. Color measurements were also made on the polymer granules. In the case of PET, measurements were made on granules in the amorphous state before being solid-state polymerised, and on granules in the crystalline state after solid-state polymerisation. Whilst these showed the same relationships between reheat and color as plaques, plaque values were taken as the truest reflection of the color of the preform and final bottle.

Carbon Blacks

Around 95% of global production of carbon black is based on the Furnace and the Channel processes (hereinafter referred to collectively as "Furnace carbon blacks"). Carbon blacks made by these processes have a primary particle diameter in the range 10 to 100 nm depending on the individual process. In contrast, a more recent and less widespread production method known as the Thermal process, produces a larger primary particle with a diameter in the range 200 to 500 nm (hereinafter referred to as "Thermal carbon blacks"). The difference in primary particle size between these two forms of carbon black is a consequence of the different conditions in the respective manufacturing processes. Preferably, the 200-500 nm particle size carbon blacks used as reheat additives in the present invention were made by the Thermal process.

The "primary particles" referred to above are the smallest, irreducible particles of material that constitute the carbon black. It is well understood that different forms of carbon black exhibit varying degrees of aggregation of these primary particles on the sub micron and micron scale. The degree of this aggregation is known to have a significant influence on its physical properties. However, we have shown that this has little influence on the optical and absorptive properties of carbon black when finely dispersed at very low concentrations in PET or PP, and hence only the primary particle size is relevant to its application for improved reheat.

Example 1

Polyethylene Terephthalate

Base polymer PET samples to demonstrate the present invention were made on a 70 Kg scale batch reactor. This consists of two separate stirred vessels, the first for the direct esterification of terephthalic acid with ethylene glycol under high pressure to produce the "monomer" and the second for the polymerisation of the monomer under vacuum (hereinafter referred to as the "autoclave"). With the exception of the carbon black reheat additive, all the samples in this example were made with identical formulations and under identical process conditions.

59.3 Kg of terephthalic acid, 1.2 Kg isophthalic acid and 29.0 Kg of ethylene glycol were charged to the esterification vessel and reacted at 250 C and at 40 pounds per square inch above atmospheric pressure until 9 liters of water had been removed from the reaction mixture. The vessel was then restored to atmospheric pressure and 10.5 g of phosphoric acid added and stirred into the monomer to act as the polymer stabiliser. The contents of the esterification vessel were then pumped to the autoclave where 19.25 g antimony trioxide (the polymerisation catalyst) was added in the form of a solution in ethylene glycol and stirred into the mixture. 0.14 g Clariant Blue-RBL dye and 0.07 g Clariant Red-GFP pigment were then added as the polymer color toners and stirred into the mixture. Finally the carbon black reheat additive, to give the desired concentration in the polymer, was added and stirred into the mixture. After all the additives had been charged, the autoclave pressure was slowly reduced to the best possible vacuum and the temperature raised to 290 C in order to carry out polycondensation of the monomer. The polymerisation reaction was terminated at a target melt viscosity of 0.60 dl/g as determined by the torque loading indication on the autoclave agitator. At this point, the molten polymer was extruded, quenched in a cold water bath and cut into granules.

In all cases the carbon black slurries were prepared in the form of 1% w/w slurries in ethylene glycol which were stirred on a Silverson high shear mixer for a period of at least two hours before being charged to the autoclave. The correct amount of slurry was immediately weighed out and charged to the autoclave after stirring to prevent any possibility of settling or agglomeration.

25 Kg batches of the amorphous base resin were re-polymerised in the solid-state at a temperature of 210 C in a fluid-bed reactor where the flow of nitrogen was sufficient to fluidise the polymer granules. The process was terminated when the polymer had reached a target melt viscosity of 0.82 dl/g, as indicated by polymer samples taken from the reactor and measured on a Davenport Melt Viscometer at 295 C.

5 Kg samples of the 0.82 dl/g solid state polymerised resin were dried for 4 hours at 175 C and then molded into 4 mm thick×10 cm diameter wide clear plaques on a Krupps KR35 single screw-injection moulding machine. These plaques were clean and free of surface contaminants, and had flat upper and lower surfaces. Reheat and color measurements were made on these plaques using the methods described above.

All of the PET plaque reheat and color data for the samples made for the present invention are shown in Table 1. In Table 1, the carbon blacks are grouped according to manufacturing process (Furnace or Thermal) and the primary particle diameter claimed by the manufacturer.

TABLE 1

PET plaque reheat and color data (Example 1)

| Carbon black | Manufacturer | Type | Addition level/ppm | Mean particle diameter/nm (manufacturer) | Plaque reheat/s (mean 4 tests) | Plaque L* | Plaque a* | Plaque b* |
|---|---|---|---|---|---|---|---|---|
| None | — | — | — | — | 0.2 | 83.1 | −1.1 | 4.1 |
| None | — | — | — | — | 1.0 | 80.9 | −0.7 | 4.8 |
| Printex F alpha | Degussa | Furnace | 1 | 20 | −1.0 | 80.2 | −1.1 | 5.2 |
| Printex F alpha | Degussa | Furnace | 2 | 20 | −4.2 | 76.4 | −1.0 | 6.0 |
| Printex F alpha | Degussa | Furnace | 3 | 20 | −6.1 | 72.9 | −0.5 | 5.2 |
| Printex F alpha | Degussa | Furnace | 5 | 20 | −9.0 | 67.0 | −0.3 | 6.7 |
| Printex F alpha | Degussa | Furnace | 5 | 20 | −9.8 | 64.0 | −0.1 | 8.7 |
| Vulcan 6 | Cabot | Furnace | 1 | 24 | −2.6 | 78.1 | −1.5 | 6.2 |
| Vulcan 6 | Cabot | Furnace | 2 | 24 | −1.7 | 76.6 | −0.9 | 6.6 |
| Vulcan 6 | Cabot | Furnace | 5 | 24 | −10.4 | 63.5 | −0.3 | 7.8 |
| Special Black 4 | Degussa | Furnace | 2 | 25 | −0.7 | 77.6 | 0.4 | 4.2 |
| Special Black 4 | Degussa | Furnace | 3 | 25 | −3.5 | 74.8 | 0.6 | 4.8 |

TABLE 1-continued

PET plaque reheat and color data (Example 1)

| Carbon black | Manufacturer | Type | Addition level/ppm | Mean particle diameter/nm (manufacturer) | Plaque reheat/s (mean 4 tests) | Plaque L* | Plaque a* | Plaque b* |
|---|---|---|---|---|---|---|---|---|
| Special Black 4 | Degussa | Furnace | 5 | 25 | −7.5 | 67.3 | 0.4 | 6.7 |
| Elftex 254 | Cabot | Furnace | 2 | 25 | −1.6 | 77.6 | −1.4 | 7.8 |
| Elftex 254 | Cabot | Furnace | 5 | 25 | −9.4 | 66.1 | −0.4 | 7.5 |
| Raven 860 | Columbian | Furnace | 5 | 40 | −2.8 | 71.6 | 0.0 | 8.9 |
| Monarch 120 | Cabot | Furnace | 5 | 75 | −8.5 | 68.8 | −0.6 | 6.6 |
| Raven 22D | Columbian | Furnace | 5 | 83 | −7.6 | 68.7 | 0.1 | 6.2 |
| Raven 410 | Columbian | Furnace | 5 | 100 | −7.1 | 71.8 | −0.8 | 6.8 |
| Carbocolor | Cancarb | Thermal | 5 | 250 | −2.7 | 79.3 | −0.8 | 4.1 |
| Carbocolor | Cancarb | Thermal | 8 | 250 | −7.7 | 74.2 | −1.1 | 4.9 |
| Carbocolor | Cancarb | Thermal | 12 | 250 | −12.2 | 69.7 | −0.7 | 4.6 |
| Carbocolor | Cancarb | Thermal | 15 | 250 | −15.0 | 68.7 | −0.8 | 4.3 |
| Thermax Stainless | Cancarb | Thermal | 5 | 250 | −3.4 | 79.5 | −1.2 | 3.9 |
| Thermax Stainless | Cancarb | Thermal | 10 | 250 | −9.5 | 73.6 | −1.0 | 4.4 |
| Thermax Stainless | Cancarb | Thermal | 15 | 250 | −12.8 | 69.8 | −1.5 | 5.1 |
| Sevacarb MT | Sevalco | Thermal | 5 | 300 | −2.0 | 80.9 | −1.0 | 3.5 |
| Sevacarb MT | Sevalco | Thermal | 8 | 300 | −6.5 | 76.2 | −1.0 | 3.6 |
| Sevacarb MT | Sevalco | Thermal | 15 | 300 | −9.3 | 74.3 | −1.2 | 4.5 |
| Thermax Stainless | Cancarb | Thermal | 5 | 250 | 0.7 | 82.2 | −1.4 | 5.1 |
| Thermax Stainless | Cancarb | Thermal | 10 | 250 | −9.1 | 72.3 | −1.2 | 5.1 |
| Thermax Stainless | Cancarb | Thermal | 15 | 250 | −15.5 | 67.6 | −1.1 | 2.6 |
| SCD530 Pureblack | Columbian | Thermal | 5 | 250 | −2.2 | 80.6 | −0.9 | 4.2 |
| SCD530 Pureblack | Columbian | Thermal | 10 | 250 | −4.4 | 77.4 | −0.7 | 4.2 |
| SCD530 Pureblack | Columbian | Thermal | 15 | 250 | −8.8 | 73.7 | −1.2 | 4.7 |
| Sevacarb MT | Sevalco | Thermal | 5 | 300 | −2.6 | 80.4 | −1.2 | 4.3 |
| Sevacarb MT | Sevalco | Thermal | 10 | 300 | −6.6 | 75.1 | −1.8 | 4.5 |
| Sevacarb MT | Sevalco | Thermal | 15 | 300 | −6.8 | 75.2 | −1.0 | 3.9 |

Figure 2:
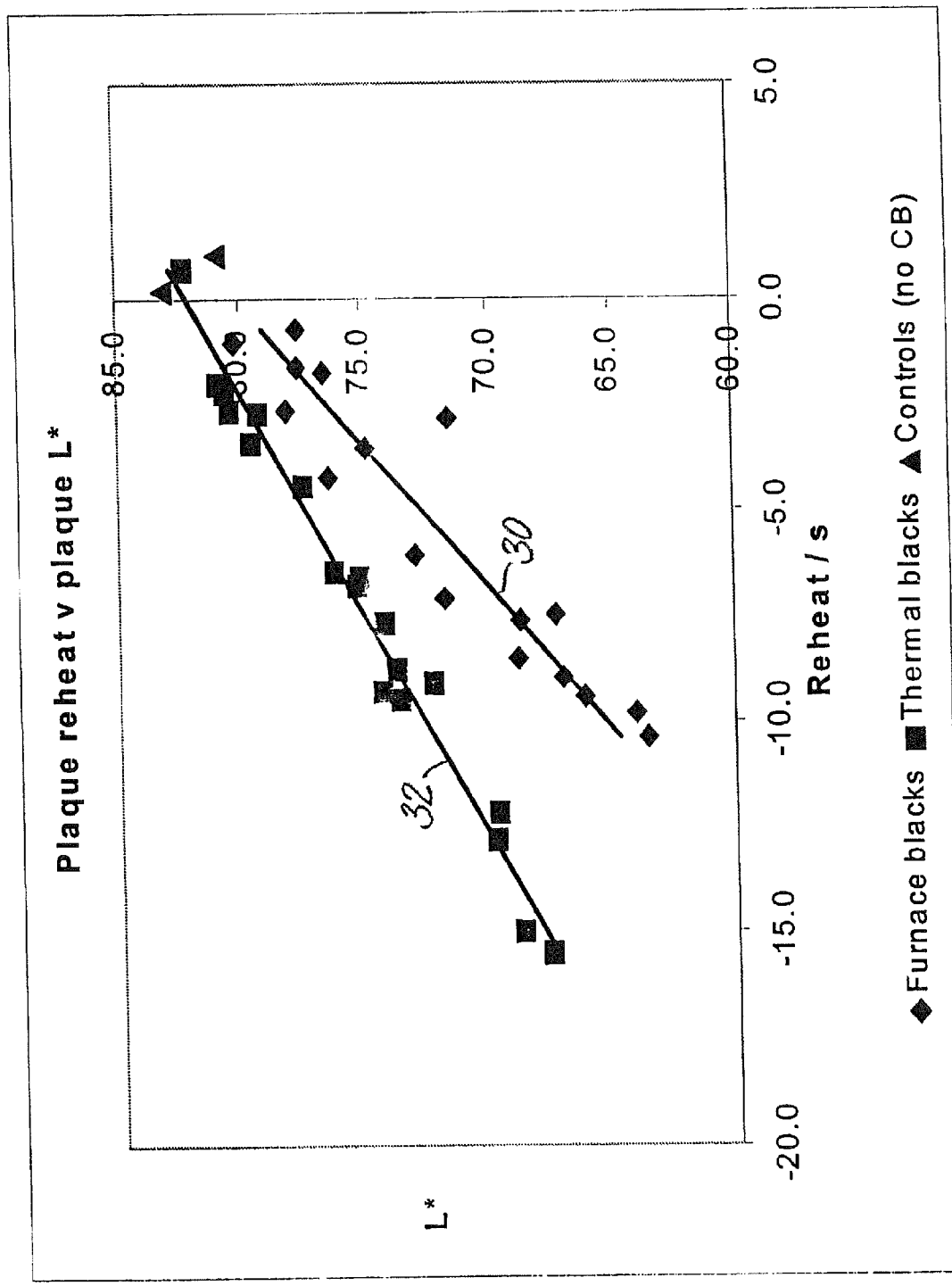
FIG. 2 is a graph of the plaque reheat versus L* color component of the plaque for the carbon black containing PET compositions described in Example 1.

FIG. 2 shows the reheat versus L* relationship for the samples of Example 1. Faster reheat is represented by an increasing negative value along the x-axis. Increasing darkness of the polymer is represented by a reducing L* value. The relationships for Furnace and Thermal carbon blacks are highly linear and quite distinct. The Thermal carbon blacks (line 30 in FIG. 2) show lighter polymer at any given level of reheat than the Furnace carbon blacks (line 32 in FIG. 2). For example, at a reheat of minus 10 seconds, a typical current manufacturing requirement, the difference in L* between Thermal and Furnace carbon blacks is about 8 units. The Thermal carbon blacks gave superior L* performance in the resin.

Figure 3:
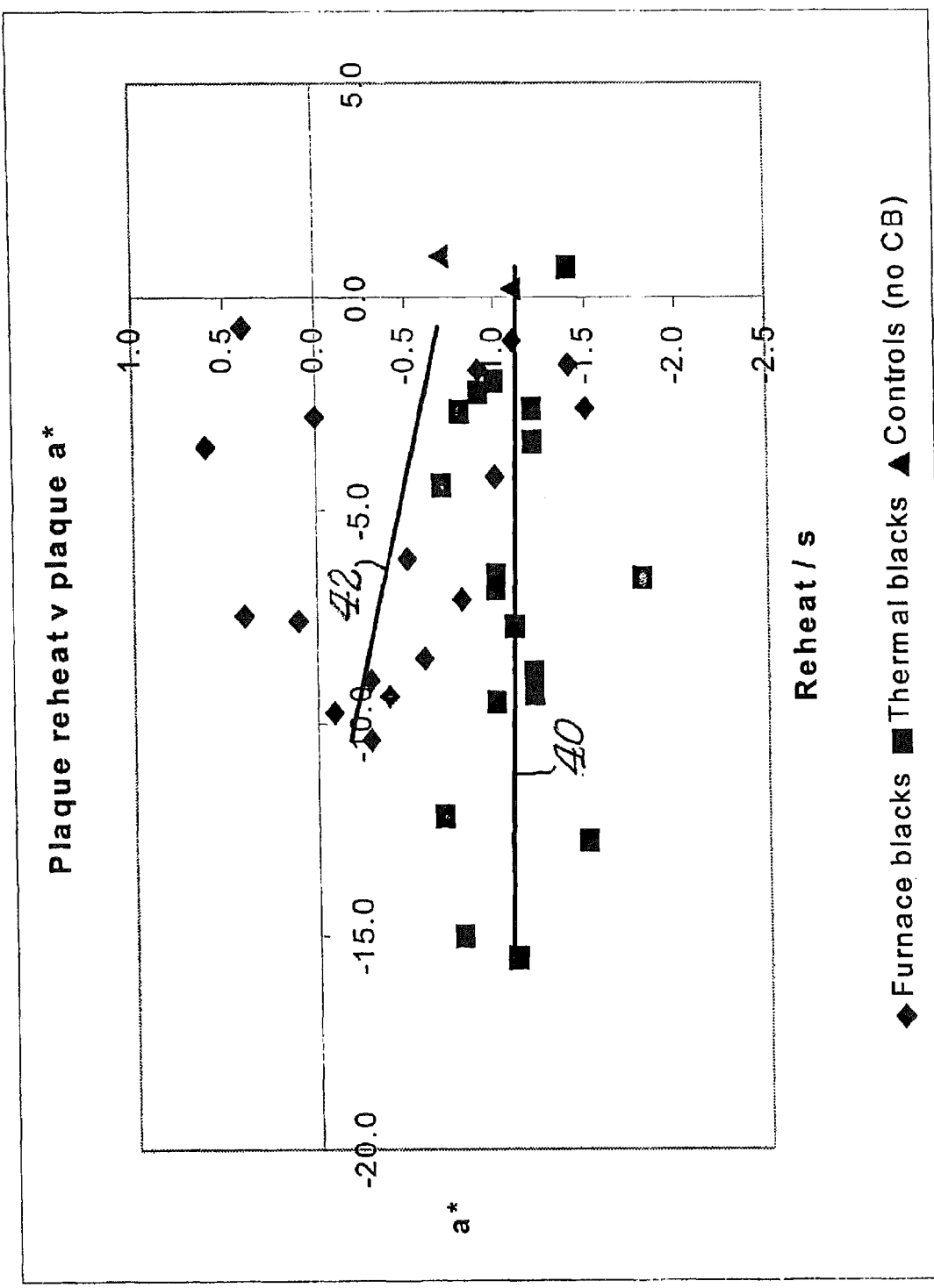
FIG. 3 is a graph of the plaque reheat versus a* color component of the plaque for the carbon black containing PET compositions described in Example 1.

FIG. 3 shows the reheat versus a* relationship for the samples of Example 1. Increasing redness of the resin is represented by an increasing positive value on the a* axis. All of the samples show a small variation in a* within the range of 0 to minus 1.5 units. However, linear regression lines show a rising a* for the Furnace carbon blacks with faster reheat (line 42 in FIG. 3), but a flat trend with the Thermal carbon blacks (line 40 in FIG. 3).

Figure 4:
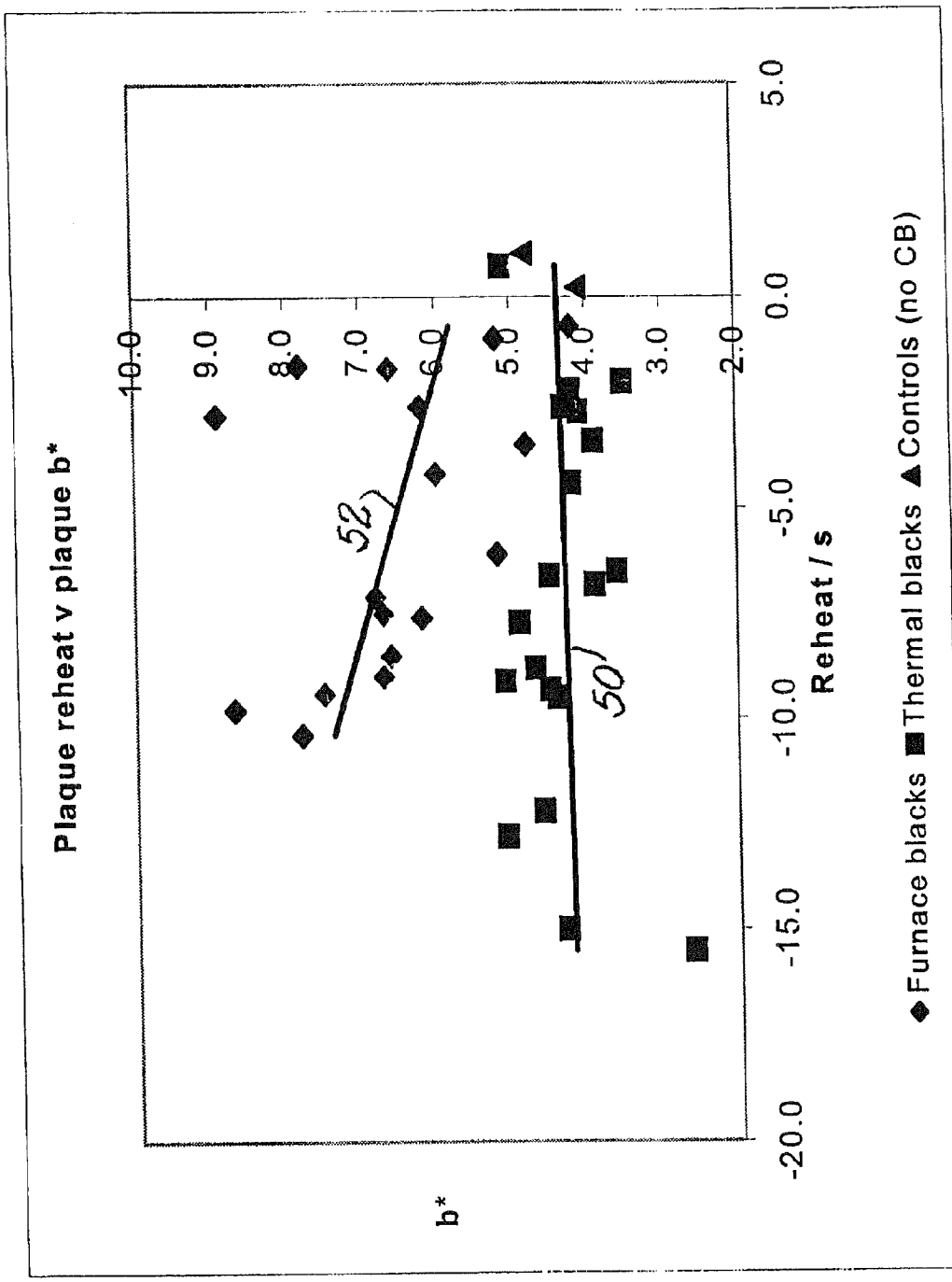
FIG. 4 is a graph of the plaque reheat versus b* color component of the plaque for the carbon black containing PET compositions described in Example 1.

FIG. 4 shows the reheat versus b* relationship for the samples of Example 1. Increasing yellowness of the resin is represented by an increasing positive value on the b* axis. Again, although the relationships for the two forms are more scattered than for L*, the b* is always higher for the Furnace carbon blacks over the whole reheat range. Therefore, the Thermal carbon blacks gave superior color on the basis of the yellowness of the resin. The linear regression lines for the two forms show an increasing trend with the Furnace carbon blacks (line 52 in FIG. 4), but a flat trend with the Thermal carbon blacks (line 40 in FIG. 4). Thus, at increasingly faster reheat, Thermal carbon blacks do not impair the color, whereas the Furnace carbon blacks lead to an increasingly yellow resin.

In considering FIGS. 3 and 4 it is well understood that a* and b* of the PET produced on a batch reactor is more subject to variation than L*. At an otherwise fixed composition, L* is primarily a function of the type and level of reheat agent used. However, a* and b* are influenced by reaction temperatures and other factors during melt polymerisation, solid state processing and injection molding that can lead to degradation of the resin. Further variation in a* and b* will also be caused by small differences in the levels of added toner and their concentrations retained in the final polymer.

In Example 1 only the relationship between reheat and color is considered. Plots of carbon black addition level against reheat, which might be subject to scatter due to inaccuracies in carbon black addition level or differences in the retention level of carbon black in the final bottle, are not necessary to show this relationship.

The data from Example 1 can be seen as two separate groups distinguished by the manufacturing route, and hence the mean particle diameter of the carbon black. Thus, in terms of the two factors generally understood to be the most important indicators of resin color, that is L* and b*, Thermal carbon blacks show an unexpected clear improvement over Furnace carbon blacks at any level of reheat improvement.

Furnace carbon blacks with 100 nm particle size do not show superior color to Furnace carbon blacks with 20 nm particle size. Hence the improvement shown in Example 1 is only demonstrated at a particle size of at least 250 nm.

Example 2

Polypropylene

PP compositions to demonstrate the present invention were prepared by compounding different types of carbon black into RE420MO polypropylene made by Borealis. 5 ml of liquid paraffin was added to 5 kg of the PP granules in a bag blender that was then tumbled to coat the granules with a thin film of paraffin. The carbon black was added to the coated granules in an amount to give the desired concentration in the final composition and the bag tumbled again to ensure an even adhesion of carbon black. The coated granules were then compounded through an APV MP2030 twin screw extruder, where the extrudate was quenched and re-cut into granules. This intermediate material was compounded again through a Boston-Matthews single screw extruder fitted with a 4-section Cavity Transfer mixer at the outlet. The extrudate was again quenched and cut into granules to provide the final composition.

Plaques were moulded from these compositions on a Krupps KR35 extruder in the same way as described for PET in Example 1. Reheat and color measurements were made on these plaques using the methods described above. The data obtained for these samples are shown in Table 2, where the reheat is quoted as the final plaque temperature. As in Table 1 for PET, the carbon blacks used to make these compositions are grouped according to the primary particle diameter claimed by the manufacturer.

using preforms moulded from two of the compositions described above, one containing a Furnace carbon black and the other containing a Thermal carbon black. In order to quantify the reheat advantage conferred by the different blacks the experiment was set up to measure the reduction in the preform heat up time possible whilst maintaining satisfactory blowing of the bottles.

The experiment was carried out using 23 g weight preforms from which 500 ml volume bottles were blown. The preforms were injection moulded under typical PP injection moulding conditions at a melt temperature of 220 C and mould temperature of 15 C on a single cavity injection mould machine. A separate laboratory blowing machine made by SIPA and specifically designed for the production of PP bottles, was then used to blow the bottles. The blowing machine had two infrared heating ovens separated by an air gap to pre-heat the preforms to the temperature required for blowing. Each oven had a maximum capacity of 10,000 watts consisting of

TABLE 2

PP plaque reheat and color data (Example 2)

| Carbon black | Manufacturer | Type | Addition level/ppm | Mean particle diameter/nm (manufacturer) | Plaque final temp./C. (mean 3 tests) | Plaque L* | Plaque a* | Plaque b* |
|---|---|---|---|---|---|---|---|---|
| None | — | — | — | — | 62.1 | 78.8 | −0.3 | 5.3 |
| None | — | — | — | — | 61.8 | 79.4 | 0.1 | 3.3 |
| None | — | — | — | — | 62.6 | 75.1 | 0.4 | 6.8 |
| None | — | — | — | — | 62.5 | 76.0 | 0.1 | 7.3 |
| Printex F alpha | Degussa | Furnace | 1 | 20 | 64.9 | 72.2 | 0.4 | 5.0 |
| Printex F alpha | Degussa | Furnace | 2 | 20 | 64.5 | 73.1 | 0.5 | 6.3 |
| Printex F alpha | Degussa | Furnace | 5 | 20 | 67.5 | 65.2 | 1.7 | 8.1 |
| Printex F alpha | Degussa | Furnace | 10 | 20 | 73.4 | 48.8 | 1.4 | 9.2 |
| Printex F alpha | Degussa | Furnace | 10 | 20 | 71.4 | 53.9 | 1.2 | 10.0 |
| Printex F alpha | Degussa | Furnace | 10 | 20 | 71.1 | 53.6 | 2.4 | 9.6 |
| Printex F alpha | Degussa | Furnace | 15 | 20 | 74.3 | 45.6 | 2.8 | 10.2 |
| Printex F alpha | Degussa | Furnace | 20 | 20 | 77.2 | 38.0 | 3.0 | 10.0 |
| Vulcan 6 | Cabot | Furnace | 5 | 24 | 67.6 | 64.6 | 0.9 | 8.7 |
| Vulcan 6 | Cabot | Furnace | 10 | 24 | 71.4 | 53.1 | 1.5 | 10.7 |
| Vulcan 6 | Cabot | Furnace | 10 | 24 | 71.4 | 53.2 | 2.6 | 10.4 |
| Vulcan 6 | Cabot | Furnace | 20 | 24 | 77.0 | 37.3 | 3.3 | 10.9 |
| Elftex 254 | Cabot | Furnace | 10 | 25 | 72.0 | 53.7 | 2.5 | 8.9 |
| Special black # 4 | Degussa | Furnace | 5 | 25 | 66.8 | 62.5 | 1.3 | 10.1 |
| Special black # 4 | Degussa | Furnace | 10 | 25 | 69.8 | 54.5 | 1.9 | 12.1 |
| Thermax Stainless | Cancarb | Thermal | 5 | 250 | 64.8 | 71.7 | 0.4 | 6.4 |
| Thermax Stainless | Cancarb | Thermal | 10 | 250 | 67.3 | 68.4 | 0.4 | 6.2 |
| Thermax Stainless | Cancarb | Thermal | 25 | 250 | 72.6 | 59.5 | 0.3 | 5.6 |
| Thermax Stainless | Cancarb | Thermal | 50 | 250 | 80.1 | 47.4 | 0.2 | 4.4 |
| Sevacarb MT | Sevalco | Thermal | 5 | 300 | 64.2 | 73.1 | 0.4 | 6.2 |
| Sevacarb MT | Sevalco | Thermal | 10 | 300 | 66.1 | 70.8 | 0.4 | 6.1 |
| Sevacarb MT | Sevalco | Thermal | 25 | 300 | 70.3 | 64.6 | 0.5 | 6.0 |
| Sevacarb MT | Sevalco | Thermal | 50 | 300 | 75.4 | 55.0 | 0.3 | 5.2 |

Figure 5:
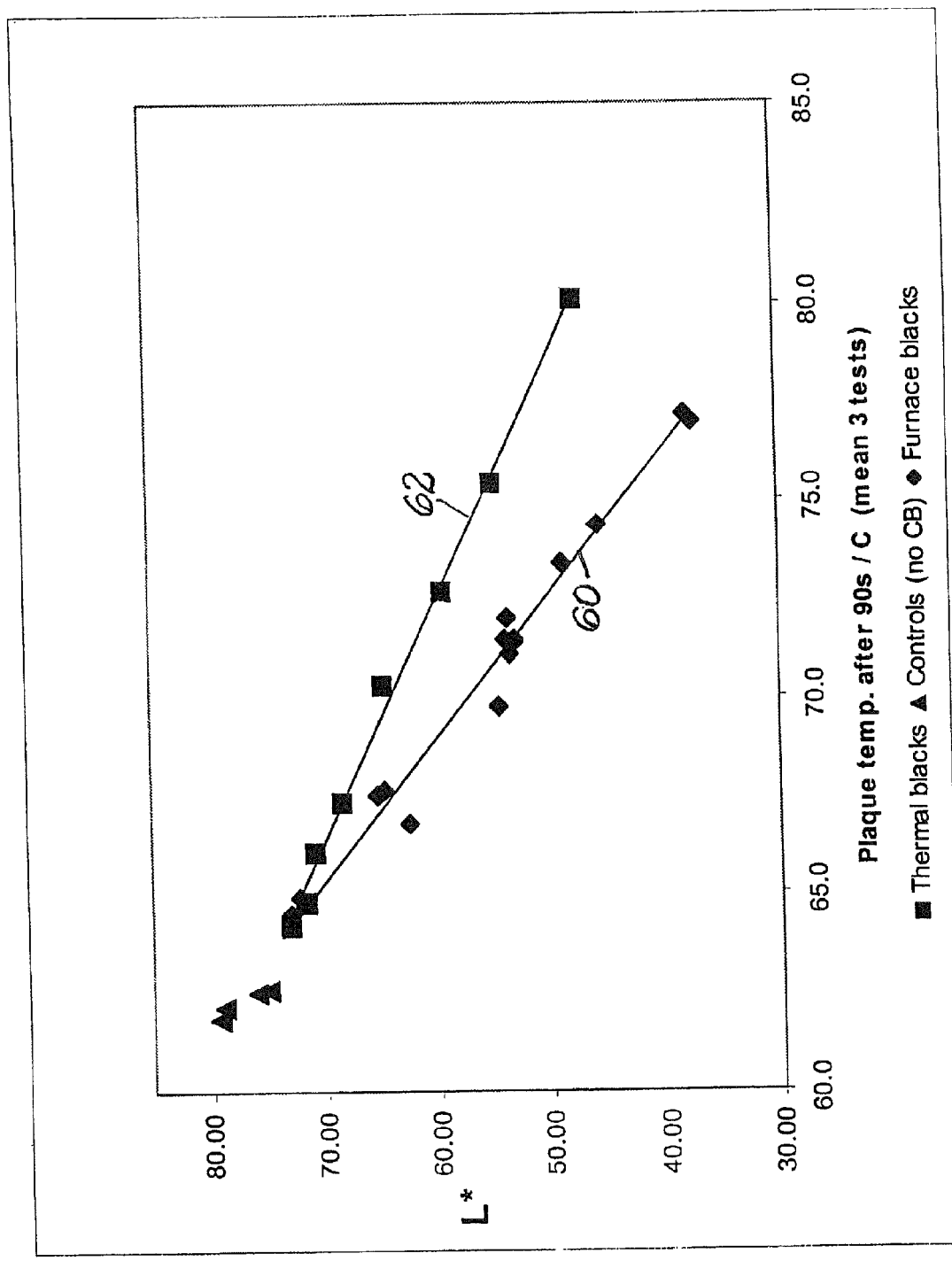
FIG. 5 is a graph of the plaque reheat versus L* color component of the plaque for the carbon black containing PP compositions described in Example 2.
Figure 6:
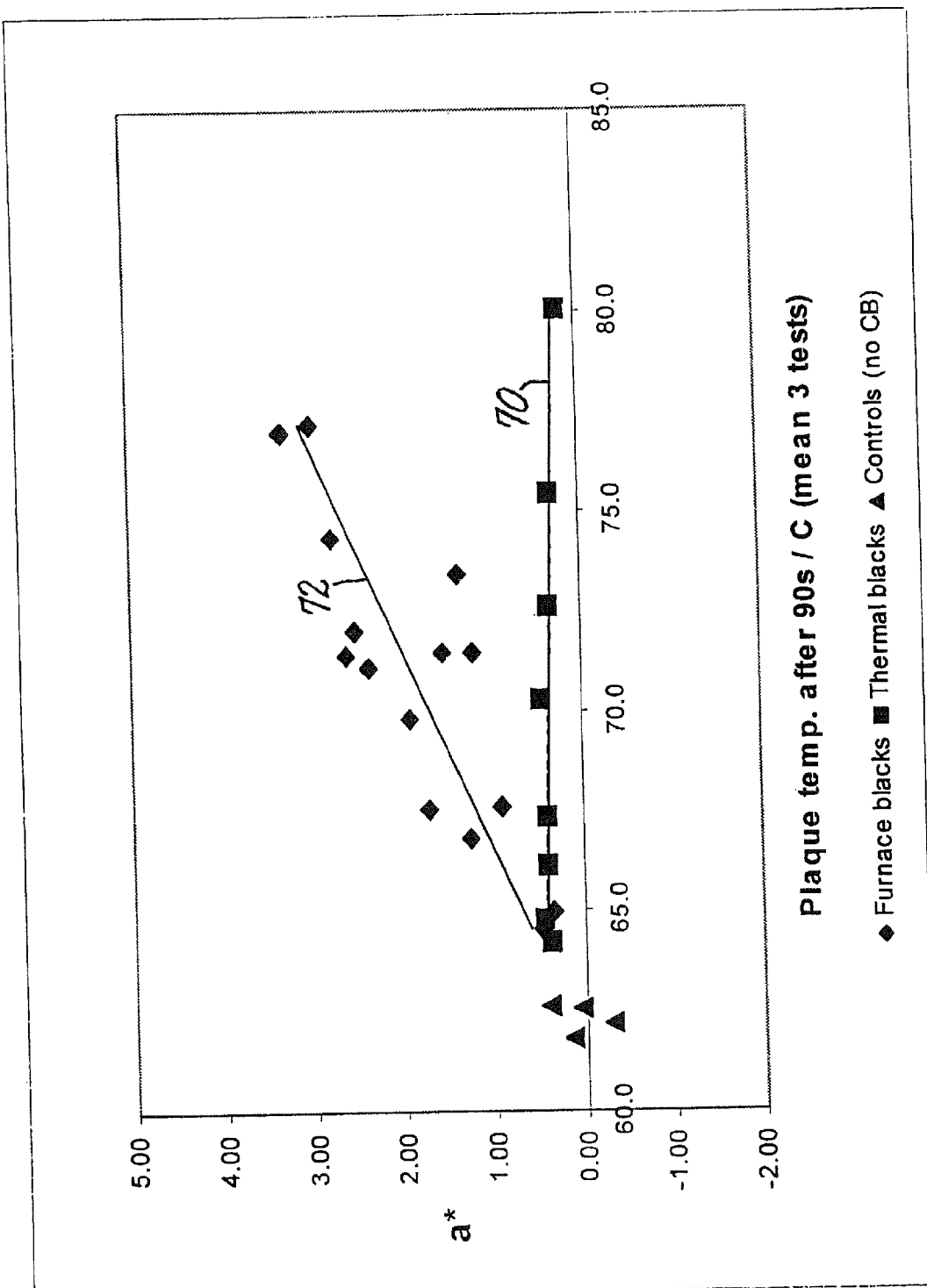
FIG. 6 is a graph of the plaque reheat versus a* color component of the plaque for the carbon black containing PP compositions described in Example 2.
Figure 7:
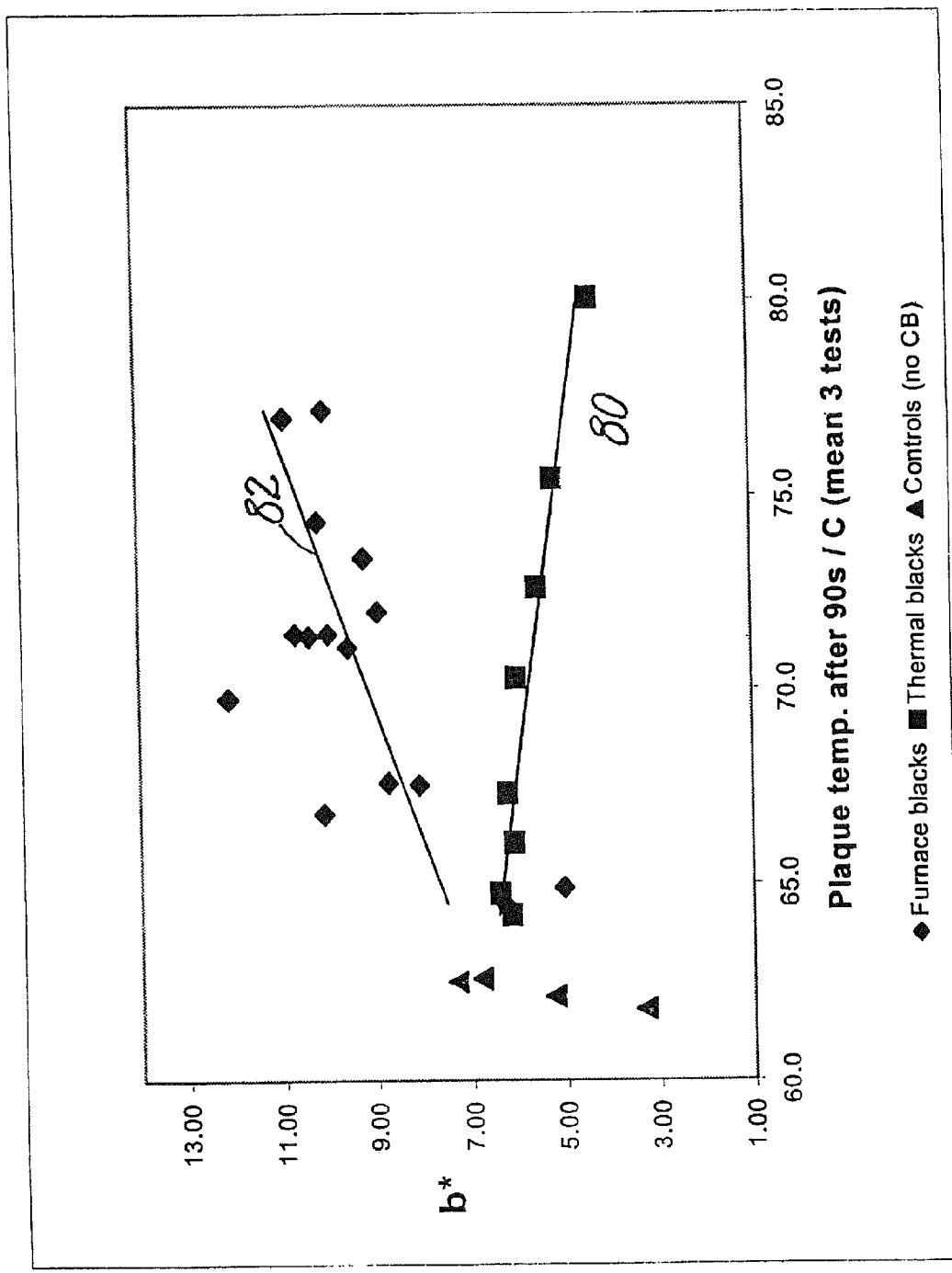
FIG. 7 is a graph of the plaque reheat versus b* color component of the plaque for the carbon black containing PP compositions described in Example 1.

From the data in Table 2, FIGS. 5, 6 and 7 show the final plaque temperature plotted against L*, a* and b*, respectively. The same relationships between the reheat temperature and individual color components are shown in FIGS. 5 to 7 for Example 2 as were shown in FIGS. 2, 3 and 4 from Example 1. Again, the data show two distinct groups according to the type of carbon black in the composition, with Thermal carbon blacks showing higher L*, and lower a* and lower b* than the Furnace carbon blacks at any given level of reheat. Thermal carbon blacks therefore unexpectedly yield superior resin color in PP in the same way as in PET.

Example 3

Polypropylene Preform Blowing

To demonstrate the present invention in a typical bottle process, a PP preform blowing experiment was performed 5×2000 watt infrared heaters arranged vertically to heat the full length of the preform body. The preforms were spun vertically on rotating holders throughout to ensure an even temperature distribution. In a continuous procedure the preforms were passed through the first oven over a period of about 60 to 80 s, through the air gap for a further 60 to 80 s to allow the temperature to equilibrate, and then through the second oven for a further 60 to 80 s. After another 10 s equilibration in air, the heated preforms were finally delivered to the blowing station.

To measure the cycle times, both ovens were fixed at 8900 watts to give a combined 17,800 watts output. The cycle time of the complete heating and blowing process was then adjusted so that the time spent by the preforms in the ovens gave a temperature that permitted the optimum bottle to be blown. Control of preform temperature to achieve the best blowing performance is well understood by those skilled in the art. If the preform temperature is too low, the preform cannot be completely blown into the bottle mould. If the temperature is too high, the material distribution is poor leading to variable thickness of the bottle wall. In this way the time required to heat preforms containing the carbon blacks was measured relative to that required for the control PP with no carbon black added. The cycle time savings observed for compositions containing various levels of a Furnace carbon black (Degussa Printex F alpha) and a Thermal carbon black (Cancarb Thermax Stainless) are shown in Table 3 and graphically in FIG. 8. These carbon blacks have mean particle sizes of 20 and 250 nm respectively.

TABLE 3

PP preform blowing cycle time reduction data (Example 3)

| Carbon black | Manufacturer | Type | Addition level/ppm | Mean particle diameter/nm (manufacturer) | Cycle time reduction from control/% | Plaque L* |
|---|---|---|---|---|---|---|
| Printex F alpha | Degussa | Furnace | 5 | 20 | 24.0 | 65.2 |
| Printex F alpha | Degussa | Furnace | 10 | 20 | 31.0 | 53.6 |
| Printex F alpha | Degussa | Furnace | 25 | 20 | 44.4 | 32.0 |
| Printex F alpha | Degussa | Furnace | 50 | 20 | 48.2 | 15.5 |
| Thermax Stainless | Cancarb | Thermal | 5 | 250 | 16.6 | 71.7 |
| Thermax Stainless | Cancarb | Thermal | 10 | 250 | 26.7 | 68.4 |
| Thermax Stainless | Cancarb | Thermal | 25 | 250 | 36.8 | 59.5 |
| Thermax Stainless | Cancarb | Thermal | 50 | 250 | 44.1 | 47.4 |

Figure 8:
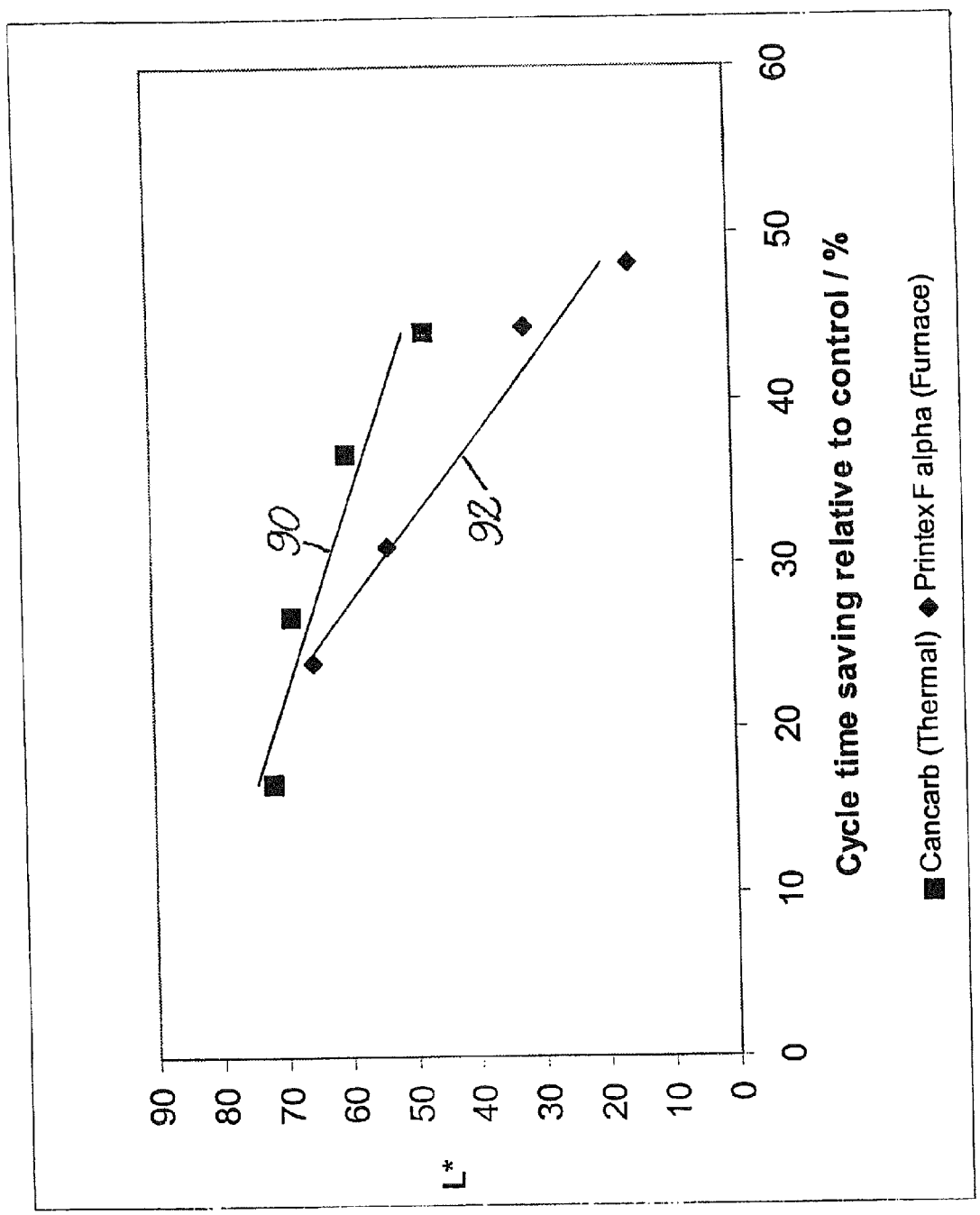
FIG. 8 is a graph of plaque L* versus cycle time savings for PP compositions containing a Furnace and Thermal carbon black reheat agent in a PP bottle blowing process.

FIG. 8 shows that both types of carbon black in the PP lead to significantly reduced cycle times. However, from the different gradients of their respective plots (lines 90 and 92 in FIG. 8), a similar cycle time reduction is achieved at a higher resin L* by using the Thermal carbon black (line 90 in FIG. 8). These plots are therefore similar in form to the L* versus plaque reheat relationships in both PP and PET. Hence this Example 3 reinforces the observations made in Examples 1 and 2. Thermal carbon black unexpectedly leads to superior resin color at any specific level of improved reheat compared to Furnace carbon black, and this difference can be shown in a practical preform blowing situation.

The invention has been illustrated by detailed description and examples of the preferred embodiments. Various changes in form and detail will be within the skill of persons skilled in the art. Therefore, the invention must be measured by the claims and not by the description of the examples or the preferred embodiments.

We claim:

1. A method for injection stretch blow molding a polyethylene terephthalate resin, comprising:
   (a) forming a resin composition that includes from 2 to 50 ppm by weight of carbon black, based on the weight of the resin composition plus carbon black, wherein the carbon black has a mean particle diameter in the range from 200 to 500 nm;
   (b) forming a preform from the resin composition; and
   (c) injection stretch blow molding the preform to form a bottle or container, wherein the bottle or container has an L* value of greater than about 67, measured by reflection when placed on a white tile.

2. The method of claim 1, wherein the carbon black has a mean particle diameter in the range of 250 nm to 300 nm.

3. The method of claim 1, wherein the carbon black is made by a Thermal process.

4. The method of claim 1, wherein the preform is reheated to a temperature for injection stretch blow molding in less time in seconds or fraction thereof than a preform of comparable resin composition that does not incorporate the carbon black.

5. The method of claim 4, wherein the less time in seconds is an improvement of at least 2 seconds of reheat time.

6. A bottle produced by the method of claim 1.

7. A method for injection stretch blow molding a polyethylene terephthalate resin, comprising:
   (a) forming a resin composition that includes from 2 to 50 ppm by weight of carbon black, based on the weight of the resin composition plus carbon black, wherein the carbon black has a mean particle diameter in the range from 250 to 300 nm;
   (b) forming a preform from the resin composition; and
   (c) injection stretch blow molding the preform to form a bottle or container.

8. The method of claim 7, wherein the preform is reheated to a temperature for injection stretch blow molding in less time in seconds or fraction thereof than a preform of comparable resin composition that does not incorporate the carbon black.

9. The method of claim 8, wherein the less time in seconds is an improvement of at least 2 seconds of reheat time.

10. A bottle produced by the method of claim 7.

11. A method for injection stretch blow molding a polyethylene terephthalate resin, comprising:
    (a) forming a resin composition that includes from 2 to 50 ppm by weight of carbon black, based on the weight of the resin composition plus carbon black, wherein the carbon black has been prepared by a Thermal process and has a mean particle diameter in the range from 200 to 500 nm;
    (b) forming a preform from the resin composition; and
    (c) injection stretch blow molding the preform to form a bottle or container.

12. The method of claim 11, wherein the preform is reheated to a temperature for injection stretch blow molding in less time in seconds or fraction thereof than a preform of comparable resin composition that does not incorporate the carbon black.

13. The method of claim 12, wherein the less time in seconds is an improvement of at least 2 seconds of reheat time.

14. A bottle produced by the method of claim 11.

* * * * *